United States Patent [19]

Daniels, Jr.

[11] Patent Number: 4,845,826

[45] Date of Patent: Jul. 11, 1989

[54] POWER PRESS

[75] Inventor: Charles M. Daniels, Jr., Chagrin Falls, Ohio

[73] Assignee: Bares Group, Chagrin Falls, Ohio

[21] Appl. No.: 190,344

[22] Filed: May 5, 1988

[51] Int. Cl.[4] .......... B23Q 3/02

[52] U.S. Cl. .......... 29/252

[58] Field of Search .......... 29/252, 751, 243.56; 269/20, 23, 224; 254/93 R; 72/409, 410; 81/355, 362, 361, 467, 479, 478, 356, 363; 91/358 R, 361

[56] References Cited

U.S. PATENT DOCUMENTS

| | | | |
|---|---|---|---|
| 2,973,625 | 3/1961 | Klingler | 269/23 |
| 4,240,280 | 12/1980 | Foslien | 72/410 |
| 4,365,792 | 12/1982 | Johns | 269/224 |
| 4,526,345 | 7/1985 | Schmidt | 254/93 R |
| 4,635,911 | 1/1987 | Lovrenich | 269/224 |

FOREIGN PATENT DOCUMENTS

| | | | |
|---|---|---|---|
| 3022490 | 12/1981 | Fed. Rep. of Germany | 269/23 |

*Primary Examiner*—Robert C. Watson

*Attorney, Agent, or Firm*—William N. Hogg

[57] ABSTRACT

A fluid actuated tool for pressing work pieces with a controlled force and dwell time is provided. The tool includes a fixed jaw and a movable jaw which is movable toward and away from the fixed jaw which arrangement allows a work piece to be squeezed between the jaws. A fluid actuated cylinder is provided which is connected to the movable jaw. The connection includes a coil spring and link and slot arrangement wherein force is transmitted to the work piece between the jaws by compression of the coil spring independent of the fluid force, and the link and slot arrangement allows limited movement of the piston independent of the movable jaw when the jaw meets the resistance of the work piece. The spring thus allows for a dwell time as well as a force independent of the fluid pressure.

7 Claims, 5 Drawing Sheets

POWER PRESS

BACKGROUND OF THE INVENTION

This invention relates to pressing devices, and more particularly to fluid actuated pressing devices, which are especially adapted to press work pieces for a controlled amount of time at a predetermined relatively constant force.

In many types of pressing operations, it is desirable to perform a pressing operation on a work piece where the total force applied must be controlled, as well as assuring sufficient dwell time to complete the operation. This type of pressing operation is necessary to properly apply insulation to exposed bare wire connections in harnesses. A particularly good type of tool for this type of operation is described in U.S. patent application Ser. No. 139,803, filed Dec. 30, 1987, now U.S. Pat. No. 4,809,534 entitled "Torque Limiting Pliers," assigned to the assignee of this invention. This device works well, but it is hand operated, and a power tool for performing this operation would be advantageous in many situations.

SUMMARY OF THE INVENTION

According to the present invention, a fluid activated pressing tool is provided in which both dwell time and applied force can be accurately controlled. The tool includes a fluid activated cylinder which includes a reciprocally movable piston. A piston rod is connected to the piston. A first jaw is fixedly connected to the tool and connection means connect a second jaw to the piston rod. Fluid control means are operably connected to the cylinder to selectively move the piston in either direction. The connection means, connecting the second jaw to the piston rod, include a spring and link means to permit limited movement of the piston with respect to the second jaw. The control and interconnection are such that the fluid pressure moves the jaws into contact with the work, and compression action of the spring provides the force applied to the work piece, the link device and flow rate of the fluid providing the dwell time for pressing action.

DESCRIPTION OF THE PREFERRED EMBODIMENT

Figure 1:
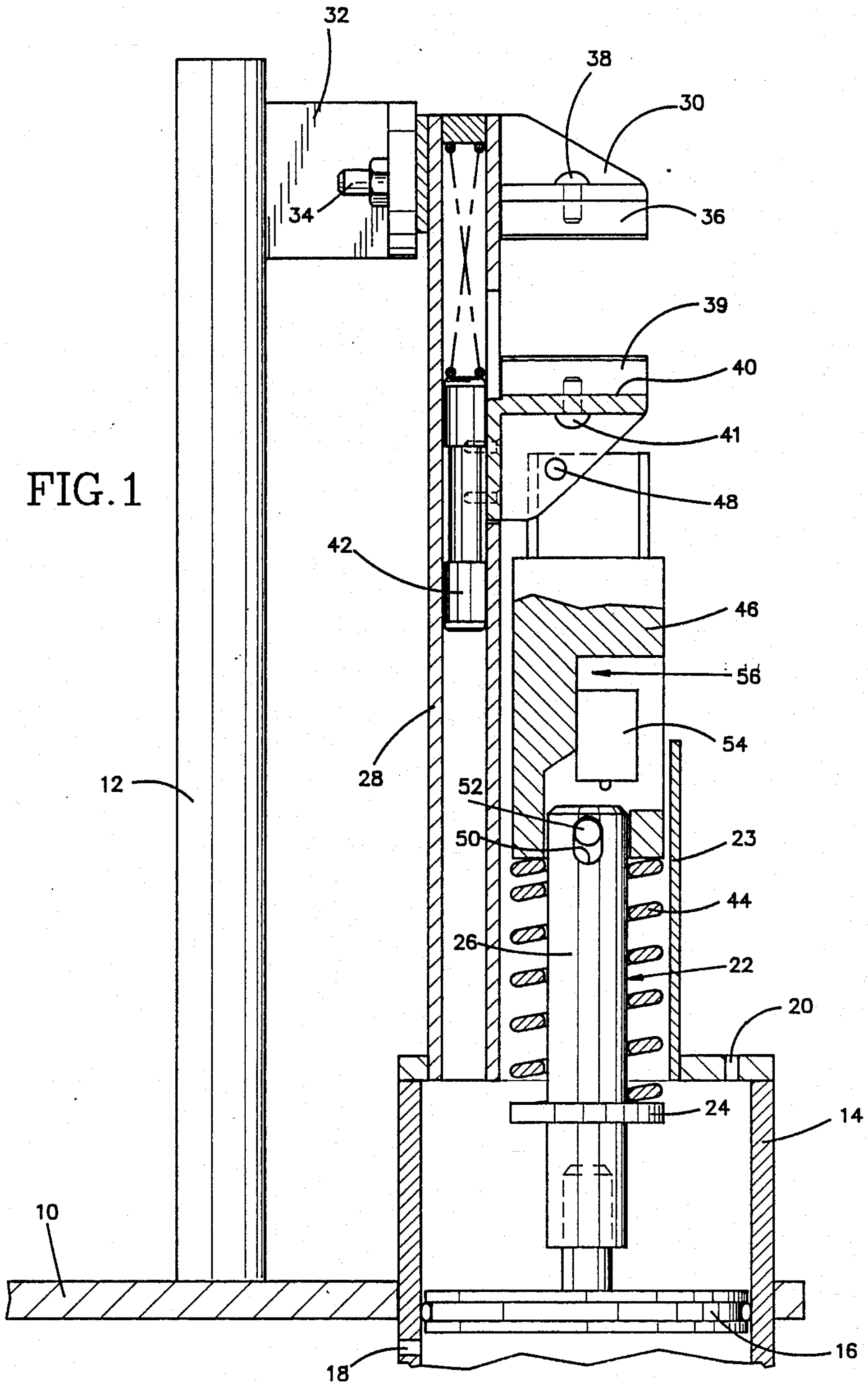
FIG. 1 is a side elevational view partially in section of a pressing tool in the retracted position according to this invention.
Figure 2:
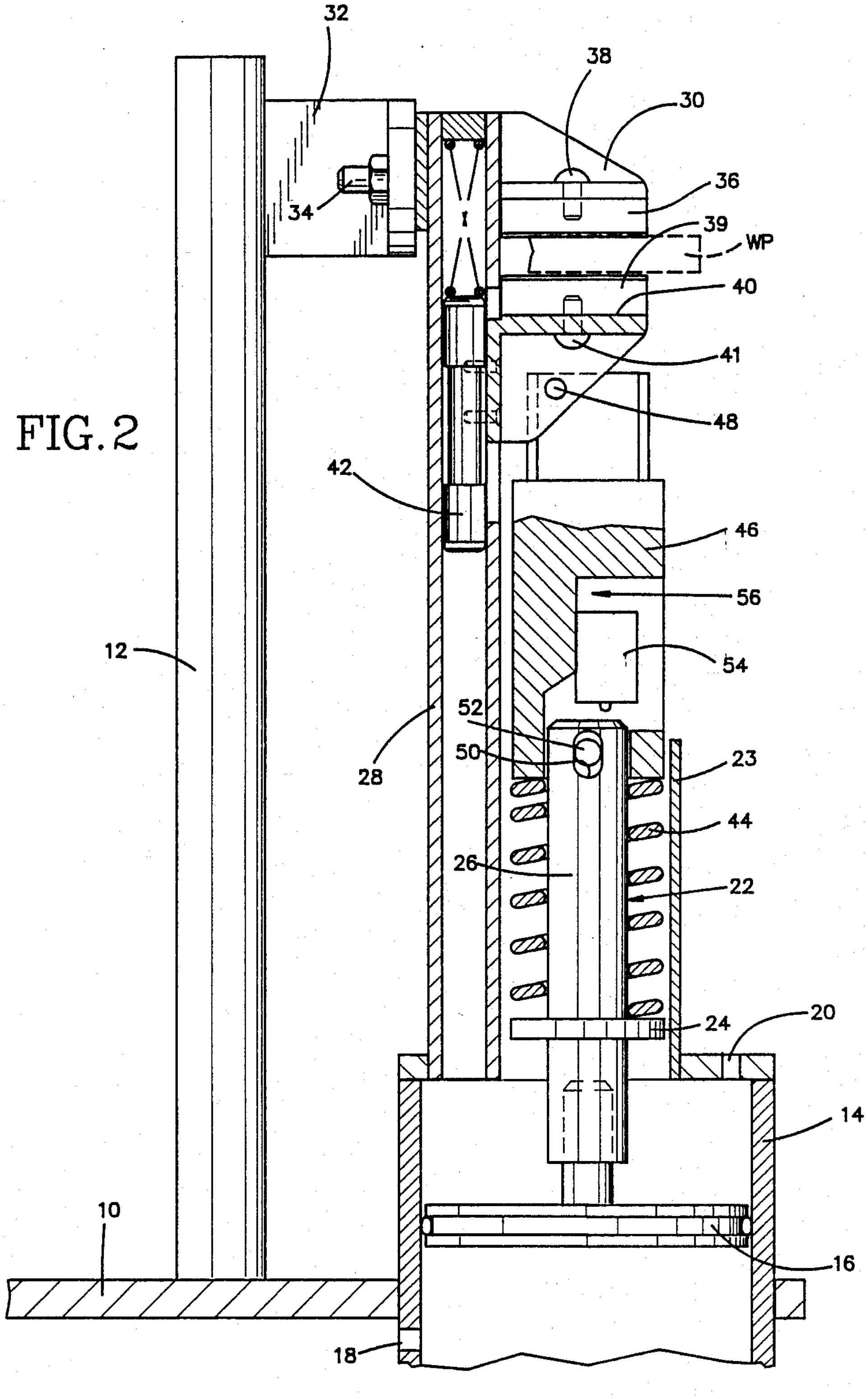
FIG. 2 is a view of the tool of FIG. 1 in the partially activated position showing the start of squeezing action of the jaw.
Figure 3:
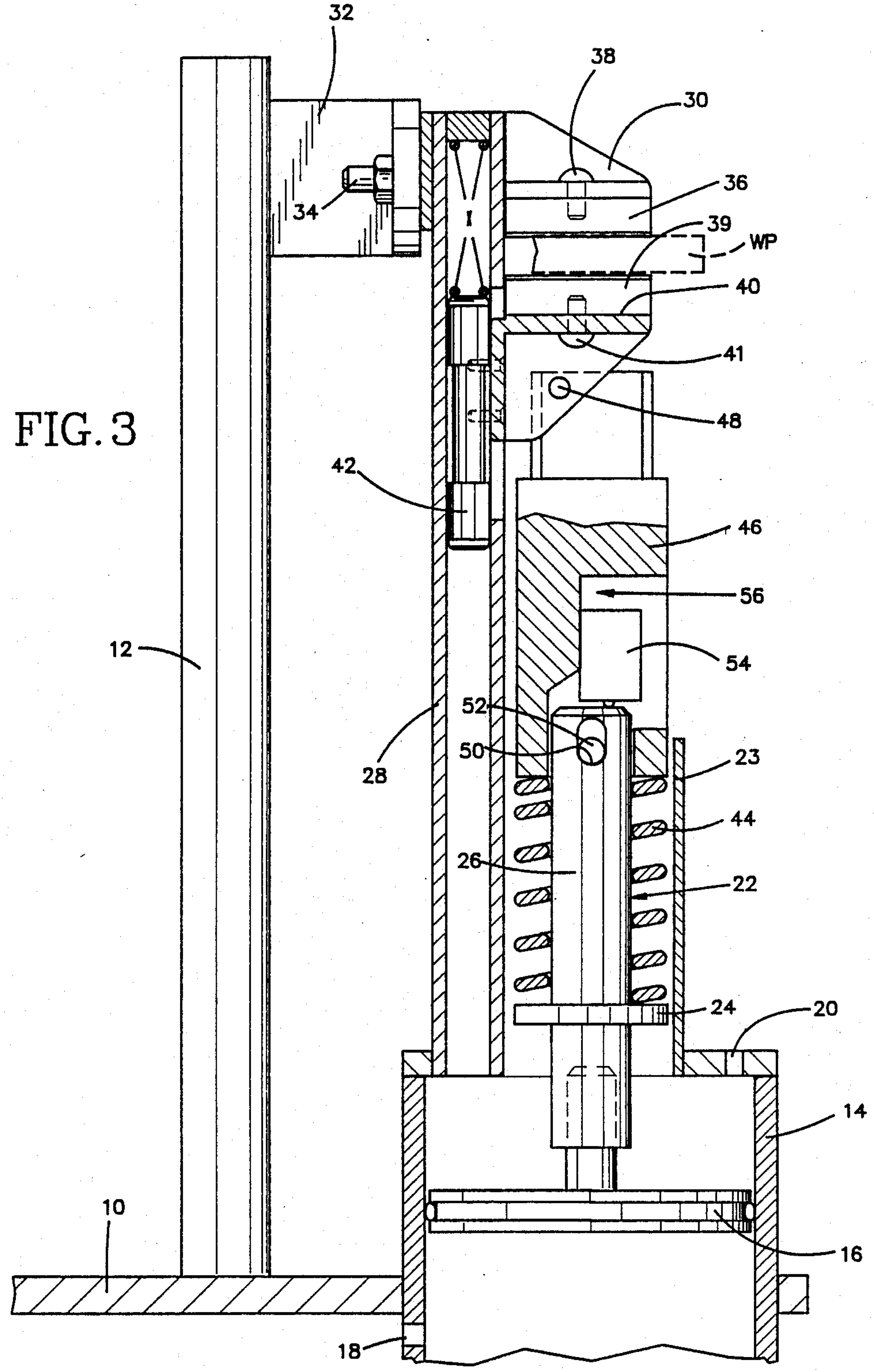
FIG. 3 is a view similar to FIG. 2 showing the tool in the fully act position.

Referring now to the drawings, and for the present to FIGS. 1 through 3, one embodiment of a pressing tool according to this invention is shown. The tool includes a base member 10 having an upwardly extending support column 12. The base member 10 also supports an air actuated cylinder 14. This cylinder 14 includes a piston 16 reciprocally mounted therein and air ports 18 and 20 at opposite ends thereof to selectively admit and exhaust air therefrom. The piston 16 has a piston rod 22 secured to one end thereof, the piston rod having an annular collar 24 and an extension 26 extending therefrom.

A hollow track 28 extends upwardly from one end of the cylinder 14 which track mounts a fixed jaw 30 at the end thereof. The jaw 30 is also secured to a mounting bracket 32 of the support column 12 by means of bolts, one of which is shown at 34. The jaw 30 also is provided with removable jaw plates 36 secured thereto by bolts, one of which is shown at 38.

A second or movable jaw member 40 is provided having a slide member 42 formed as a part thereof and slideably mounted within the hollow track 28. This allows the movable jaw 40 to slide reciprocally in the track 28 toward and away from the first jaw 30. The movable jaw member 40 is provided with a removable jaw plate 39 secured thereto by bolts, one of which is shown at 41.

The piston rod 22 is connected to the movable jaw 40 by means of a coil spring 44 and a link 46. The link 46 is connected to the jaw 40 by means of a pin 48, and the coil spring 44 surrounds the extension 26 and is captured between the collar 24 and the end of the link 46. The connection of the piston rod 22 to the link 46 also includes a slot 50 formed in the extension 26 and a pin 52 carried oy said link and extending through said slot 50. With this type of driving connection, when the piston is activated to drive the piston upwardly from the position shown in FIG. 1, the driving force is transmitted to the movable jaw 40 through the coil spring 44, and the piston 16, piston rod 22, the link 46 and movable jaw 40 will all move together until the device reaches the position shown in FIG. 2. At this point when the jaws 30 and 40 encounter resistance supplied by a work piece WP shown in broken outline interposed between the two jaws which resistance force is greater than the spring rate of the coil spring 44, the movable jaw 40 and link 46 will be restrained from movement. However, continued force applied to the piston will cause the piston 16 and piston rod 22 to continue to move upwardly by virtue of the slot 50 and pin 52 interconnected and will compress the coil spring 44, thus applying a force to the work piece WP which is a function of load rate of spring 44. A limit switch 54 is provided in a slot 56 formed in the link 46 and coactable with the extension 26 of the piston rod 22 to signal when the piston has traveled a given distance in compressing the spring as shown in FIG. 3. Hence the force applied to the work piece WP between the jaws is a function of the spring load rate and independent of the force or air pressure applied to the air cylinder 14. Also the dwell time or the time the pressure is being applied to the work piece is a function of the flow rate of the air from the fluid cylinder. The pneumatic circuitry to operate the piston is shown in FIGS. 4 through 6.

Figure 4:
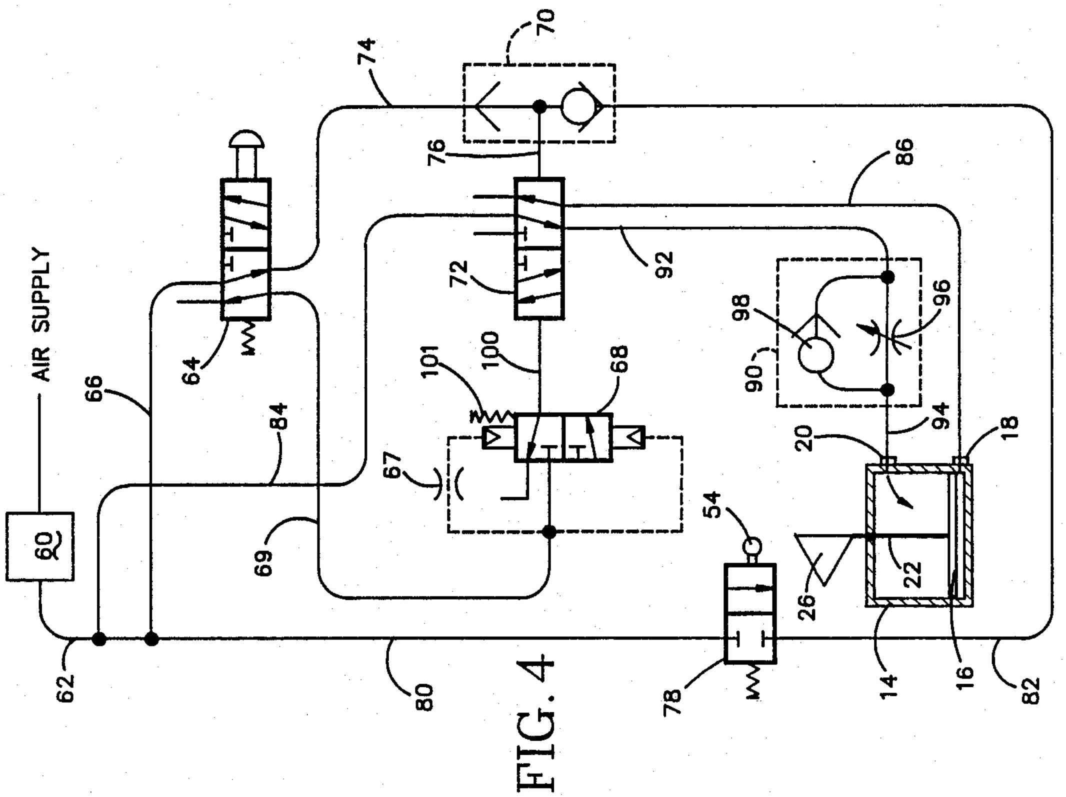
FIG. 4 is a diagrammatic view of the pneumatic circuit of the tool of this invention showing the position for the retracted position.

Referring now to FIG. 4, the pneumatic circuitry for operating the cylinder 14 is shown in the retracted position. Compressed air is supplied from an air source through a filter regulator and oiler 60 to a supply line 62. A palm button four-way valve 64 is connected to the supply line 62 by a line 66 and is selectively connected to a fixed output flow control pilot valve 68 through line 69 and through a reversible check valve 70 to one end of a four-way double acting pilot valve 72 by lines 74 and 76. The air supply line 62 is also connected through a two-way limit valve 78 to the opposite side of the reversible check valve 70 by lines 80 and 82. The supply line 62 is connected to one side of the double acting pilot valve 72 by line 84. The opposite side of the double acting pilot valve 72 is selectively connected to either port 18 of air cylinder 14 by line 86 or to port 20 through variable output control valve 90 by lines 92 and 94. The variable output control valve has a variable control orifice 96 and a one-way check valve 98 connected in parallel. The limit switch 54 is connected to the two-way limit valve 78 and coacts with the end of extension 26 of the piston rod 22. A line 100 is selectively connectable between flow control pilot valve 68 and double acting pilot valve 72.

The retracted position of the tool as shown in FIG. 1 corresponds to the valve setting of the circuitry shown in FIG. 4. As can be seen in FIG. 4, the air is supplied through lines 62 and 84, double acting pilot valve 72, line 92, variable output control valve 90, and line 94 to port 20, thus driving the piston 16 to its full retracted position. The one-way check valve 98 allows full essentially unrestricted flow to the port 20. The port 18 is exhausted to atmosphere through line 86 and double acting pilot valve 72.

Figure 5:
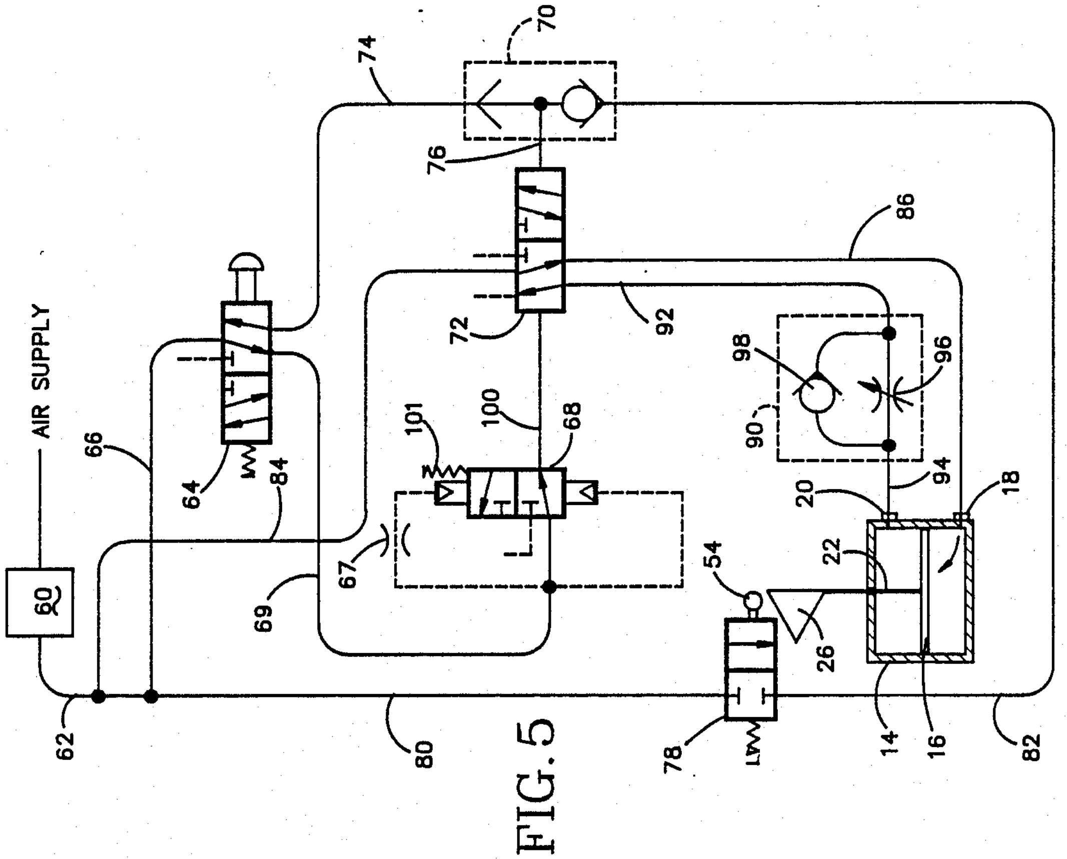
FIG. 5 is a view similar to FIG. 4 showing the circuit positions corresponding to a partially activated position.
Figure 6:
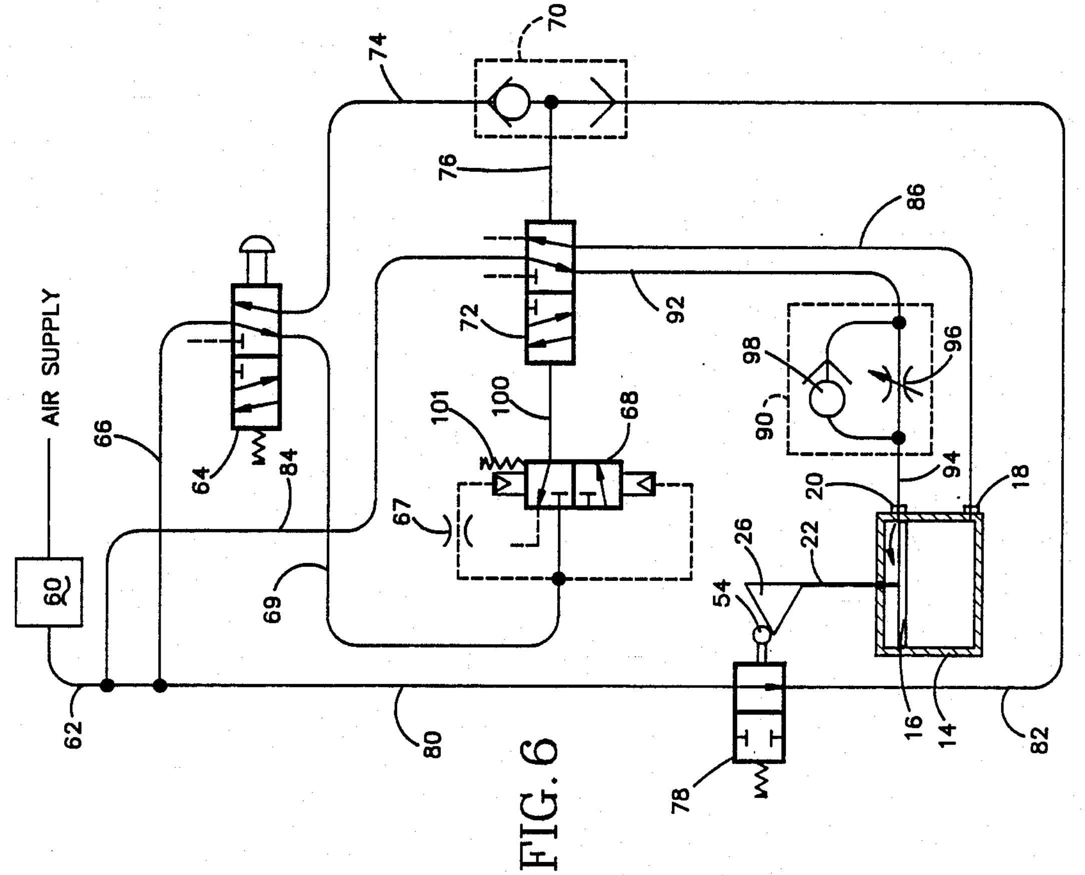
FIG. 6 is a view similar to FIG. 5 corresponding to the tool in the fully activated position having just initiated the return cycle.

In order to actuate the press, the palm valve 64 is activated to the position shown in FIG. 5. This will connect the flow control pilot valve 68 through the palm valve 64 to the supply line 62. Because of the flow control orifice 67 in one side of the valve 68, the flow control pilot valve will be shifted to the position shown in FIG. 5. This will cause air to flow through the valve 68 to line 100 which will shift the double acting pilot valve 72 to the position shown in FIG. 5. This will connect the air supply line 62 through line 84, valve 72 and line 86 to port 18 and connect port 20 through line 94 variable output control valve 90, line 92 and valve 72 to exhaust. This will start the piston 16 to move upwardly as shown in FIG. 5. The rate of speed of piston travel will be controlled by the rate of flow through the variable control orifice 96. This movement of the piston will continue until it reaches the position shown in FIG. 6. It will be remembered that the piston 16, piston rod 22 and extension 26, link 46 and jaw 40 will move as a unit until the jaw's movement is restricted by a work piece. The piston 16 and piston rod 22 will then continue moving with the movable jaw 40 and link 46 remaining stationary and the coil spring compressing until the piston rod extension 26 engages limit switch 54 as shown in FIGS. 3 and 6.

Referring again to FIG. 6, at this position the extension 26 activates switch 54 shifting the two-way limit valve 78 to the position shown in FIG. 6. This will connect supply line 62 to the double acting pilot valve 72 through lines 80, 82 and check valve 70. This will cause the valve 72 to shift back to the position shown in FIG. 6 which will connect port 20 to air supply line 62 through line 94, variable output control valve 90, line 92, valve 72 and line 84 and connect port 18 to exhaust through line 86 and valve 72. This will drive the piston 16 back to its retracted position. Also during the activating movement, the flow control pilot valve 68 will have reset itself when the pressure on both sides of the valve has equalized and the return spring 101 shifts the valve.

Once the device has been activated, and has gone through its cycle and then returned to the retracted position, it will remain there until the palm valve is released and again activated.

If the palm button is released at any time during any part of the cycle, the cylinder will immediately retract because all components will return to the position they held in FIG. 4.

While the invention has been described in conjunction with the use of air, other gases or fluids such as hydraulics can also be utilized with various modifications to the circuit as necessary.

While the invention has been described with some degree of particularity, various modifications and changes can be made without departing from the scope of the appended claims.

What is claimed is:

1. A fluid actuated pressing device comprising, a fluid actuated cylinder having a piston reciprocally mounted therein movable between an actuated position and a retracted position, a piston rod connected to said piston and movable therewith, first jaw means fixedly carried by said device;

second jaw means and connection means connecting said second jaw means to said piston rod for coaction with said first jaw means when said piston is moved to its actuated position;

fluid control means operably connected to said cylinder to selectively move said piston in either direction between said actuated position and said retracted position to cause pressing action between said jaws and a work piece;

said connection means including spring means interposed between said piston rod and said second jaw means and including means to permit movement of the piston a selected distance with respect to said second jaw means by compressing said spring when movement of said second jaw means is prevented;

means operatively connected to said second jaw means and operable by said piston rod to cause the control means to return the piston to its retracted position after the piston has moved said selected distance with respect to said second jaw;

whereby the force applied to a work piece by the jaws is a function of the spring rate and independent of the fluid pressure, and the time the force is applied by the jaws is a function of the flow rate of the fluid.

2. The invention as defined in claim 1, wherein means provided to selectively control the rate of movement of the piston in a direction which moves the second jaw toward the first jaw.

3. The invention as defined in claim 2, wherein said means to control the rate of movement of the piston includes flow control means to control the rate of flow of fluid to or from the cylinder.

4. The invention as defined in claim 1, wherein said piston rod includes a collar member and an extension member extending from said collar, and wherein the spring means is interposed between said collar and said second jaw; and wherein said connection includes a pin and slot interconnection between said second jaw and said extension member to allow limited movement of said extension with respect to said second jaw.

5. The invention as defined in claim 4, wherein the pin and slot interconnection provides the driving force to move the second jaw responsive to movement of the piston rod to the retracted position.

6. The invention as defined in claim 1, wherein the fluid actuated device is air actuated.

7. The invention as defined in claim 6, wherein the fluid control means includes operator actuated valve means to actuate said cylinder to move the piston from said retracted position to said actuated position.

* * * * *